United States Patent [19]

Anderson et al.

[11] 3,889,294

[45] June 10, 1975

[54] MEANS FOR RECORDING MULTI-BIT CHARACTER DATA

[75] Inventors: Richard S. Anderson; Robert L. Crafts; John A. Murphy; Irvin L. Patterson; Harold P. Schultz, all of Tulsa, Okla.

[73] Assignee: Midwestern Instruments, Inc., Tulsa, Okla.

[22] Filed: Sept. 2, 1970

[21] Appl. No.: 69,036

[52] U.S. Cl. .................................................. 360/52

[51] Int. Cl. .................................................. G11b 5/09

[58] Field of Search..............340/174.1 A, 174.1 G, 340/174.1 H; 179/15 BV, 100.2 T; 226/124; 360/52

[56] References Cited

UNITED STATES PATENTS

| | | | |
|---|---|---|---|
| 2,907,005 | 9/1959 | Chien et al. | 340/174.1 A |
| 3,123,810 | 4/1964 | Strauch, Jr. et al. | 340/174.1 A |
| 3,237,176 | 2/1966 | Jenkins | 340/174.1 G |
| 3,289,189 | 11/1966 | Clark et al. | 340/174.1 R |
| 3,465,128 | 9/1969 | Poumakis et al. | 340/174.1 A |
| 3,465,349 | 9/1969 | Schoeneman | 340/174.1 A |
| 3,474,429 | 10/1969 | McCowen et al. | 340/174.1 A |

*Primary Examiner*—Vincent P. Canney

[57] ABSTRACT

A means for recording multi-bit character data on tape at a given character per second rate and playing back such data at the same different character per second rate, including means of advancing tape at a preselected write rate past a serial data receiving write head in uniform incremental steps for each data character recorded; the time duration of each incremental tape advancement being predeterminedly selectable, means for rewinding the tape, means for advancing the tape having the data recorded thereon at a preselected read rate continuously past a read head, a means of processing the multi-bit character input to take advantage of the incremental tape movement, and a means of maintaining the multi-bit character integrity on subsequent play-back.

4 Claims, 7 Drawing Figures

INVENTORS.
RICHARD S. ANDERSON
ROBERT L. CRAFTS
JOHN A. MURPHY
IRVIN L. PATTERSON
HAROLD P. SCHULTZ
BY Head & Johnson
ATTORNEYS INVENTORS.
RICHARD S. ANDERSON
ROBERT. L. CRAFTS
JOHN A. MURPHY
IRVIN L. PATTERSON
HAROLD P. SCHULTZ
BY Head & Johnson
ATTORNEYS

PATENTED JUN 10 1975 3,889,294

SHEET 3

INVENTORS.
RICHARD S. ANDERSON
ROBERT L. CRAFTS
JOHN A. MURPHY
IRVIN L. PATTERSON
HAROLD P. SCHULTZ
BY Head & Johnson
ATTORNEYS INVENTORS.
RICHARD S. ANDERSON
ROBERT L. CRAFTS
JOHN A. MURPHY
IRVIN L. PATTERSON
HAROLD P. SCHULTZ
BY Head & Johnson
ATTORNEYS

MEANS FOR RECORDING MULTI-BIT CHARACTER DATA

BACKGROUND AND OBJECTS OF THE INVENTION

In handling digital data it is frequently necessary to record and store the data for subsequent use. This invention relates to a data recording and storage device but more particularly to a device by which data, in multi-bit character form, may be stored at any rate up to a maximum character per second rate and subsequently played back at the same or a predetermined higher character per second rate.

When a typical tape recorder is utilized for storing data the tape is conducted past a write head at a given fixed rate during which time the incoming data is transferred to the tape. The tape may then be rewound and the data subsequently delivered by advancing the tape, at the same fixed rate, past a read head. In such case the data must be redelivered at the same fixed rate received. That is, the speed of the tape on replay cannot be accelerated or decelerated materially without impairing the integrity of the data. The reason is apparent when it is considered that multi-bit character data exists in the form of timed spaced bits and only when the bits are generated, during the read process, in substantially the same time spaced relationship is the data faithfully reproduced. Thus with the typical recorder device the multi-bit character must be recorded and reproduced at the same rate.

This invention overcomes this limitation and provides a means whereby data may be recorded at any character-persecond rate up to a maximum rate, that is, the rate at which it is available, such as from a teletypewriter or teletypewriter transmission line, and played back for subsequent use at the same rate it is received or at a different predetermined higher rate.

SUMMARY OF THE INVENTION

This invention relates to incremental tape recorders and particularly to the method of incrementing a drive capstan in a way to provide means for changing the rate of incrementation by one simple operation and the method of processing the input multi-bit character data accompanying the incrementing procedure.

A capstan having a continuously rotating flywheel is equipped with a unidirectional clutch which includes a multitooth ratchet and a solenoid or other mechanical or electromechanical device to hold and/or release the clutch as a means for incrementally starting and stopping the capstan rotation which in turn controls the movement of a magnetic tape. If the ratchet contains one tooth, then each time the solenoid is actuated long enough for the tooth to rotate past the solenoid plunger and then released, the capstan will rotate one revolution and stop. The length of tape moved during the operation is equal and limited to the circumference of the capstan. This incrementing operation can be repeated at any time, to a maximum rate defined by the velocity of the flywheel drive expressed in revolutions per second. For example, if the flywheel drive is turning at five revolutions per second, then the incrementing rate obtainable is zero to five increments per second maximum.

When a ratchet containing more than one tooth is used, and the teeth being equally spaced, each time the solenoid is actuated to allow one tooth at a time to be released and then deactuated to stop the next tooth, then the length of tape moved during each operation is equal to the capstan circumference divided by the number of teeth on the ratchet, and the rate of incrementing is from zero to a maximum rate as defined by the velocity of the flywheel drive expressed in revolutions per second times the number of teeth on the ratchet. Thus, a higher number of increments per second is achieved by changing the ratchet to one with more teeth, and conversely to a lower number of increments per second by changing the ratchet to one with fewer teeth.

This invention provides a means for changing the rate of incrementation without changing the ratchet, that is, by operating a switch to change the time duration that the solenoid is held actuated. This accomplishes the same effect as physically changing the ratchet and can be performed as often and as quickly as required. A ratchet is used with a plurality of teeth and a timing circuit for each incrementing rate limit desired with means to switch from any timing circuit to any other in the system.

Each timing circuit is adjusted to provide a given actuating signal to the solenoid for a controlled time period allowing either one tooth, or two teeth, or three teeth, etc., to pass the solenoid plunger before deactuating the solenoid. Thus, if the solenoid is connected to a very short "on" time circuit such that only one tooth passes, then the maximum incrementing rate is achieved. If the solenoid is actuated by a timing circuit which allows two teeth to pass and then deactuate, only one-half the maximum rate is obtained. For example, a six-tooth ratchet operating with a flywheel drive rotating five revolutions per second will provide a rate of zero to thirty increments per second when one-tooth increments are used. The same mechanism provides zero to fifteen increments per second when the solenoid "on" time allows two teeth to pass with each operation. Allowing three teeth to pass with each operation provides zero to ten increments per second; four teeth gives zero to seven and one-half increments per second; etc.

Since the input multi-bit character is usually longer in time than the time required for one or more teeth to increment, the input multi-bit character must be compressed in time such as to permit recording in the minimum incrementing time, i.e., the time required for one tooth to pass the solenoid. The compression of the multi-bit character is accomplished by using a parallel input serial output shift register entitled an input-output data register. The incoming multi-bit character is temporarily stored in the input-output data register. Upon detection of a predetermined bit or upon a command accompanying the parallel data input a timing and control circuit energizes the incrementing solenoid, provides a slight time delay to permit the magnetic tape to reach its steady-state speed, and then serially shifts the multi-bit character out of the input-output data register. The timing and control circuit provides the shifting of a much higher rate than the input multi-bit character rate. To preserve the integrity of the recorded time compressed multi-bit character, the timing and control circuit provides pulses which are recorded along with the time compressed multi-bit character. These recorded pulses from the timing and control circuit mark the boundaries between which each bit must exist. To reduce the possibility of a bit loss because of flaws on the magnetic tape a two track head with both tracks wired in series is used. This method of recording would require a flaw to subtend more than 80 percent of the tape width in order to cause the loss of a bit.

OBJECTS OF THE INVENTION

A primary object of the invention is to provide a means for recording multi-bit character data on magnetic tape at any rate up to a given maximum (determined by mechanical constraints) character per second rate and playing back such data at the same or a predetermined higher character per second rate. More particularly, an object of this invention is to provide a recording means for recording digital data submitted in serial or parallel form and in an arrangement wherein the data is recorded at the speed received and made available by playback of the recording means at the same or a preselected different higher speed in an arrangement wherein the integrity of the data is completely maintained.

These general objects as well as other and more specific objects of the invention will be understood by the following specification and claims, taken in conjunction with the drawings.

DESCRIPTION OF THE VIEWS

DETAILED DESCRIPTION

Figure 1:
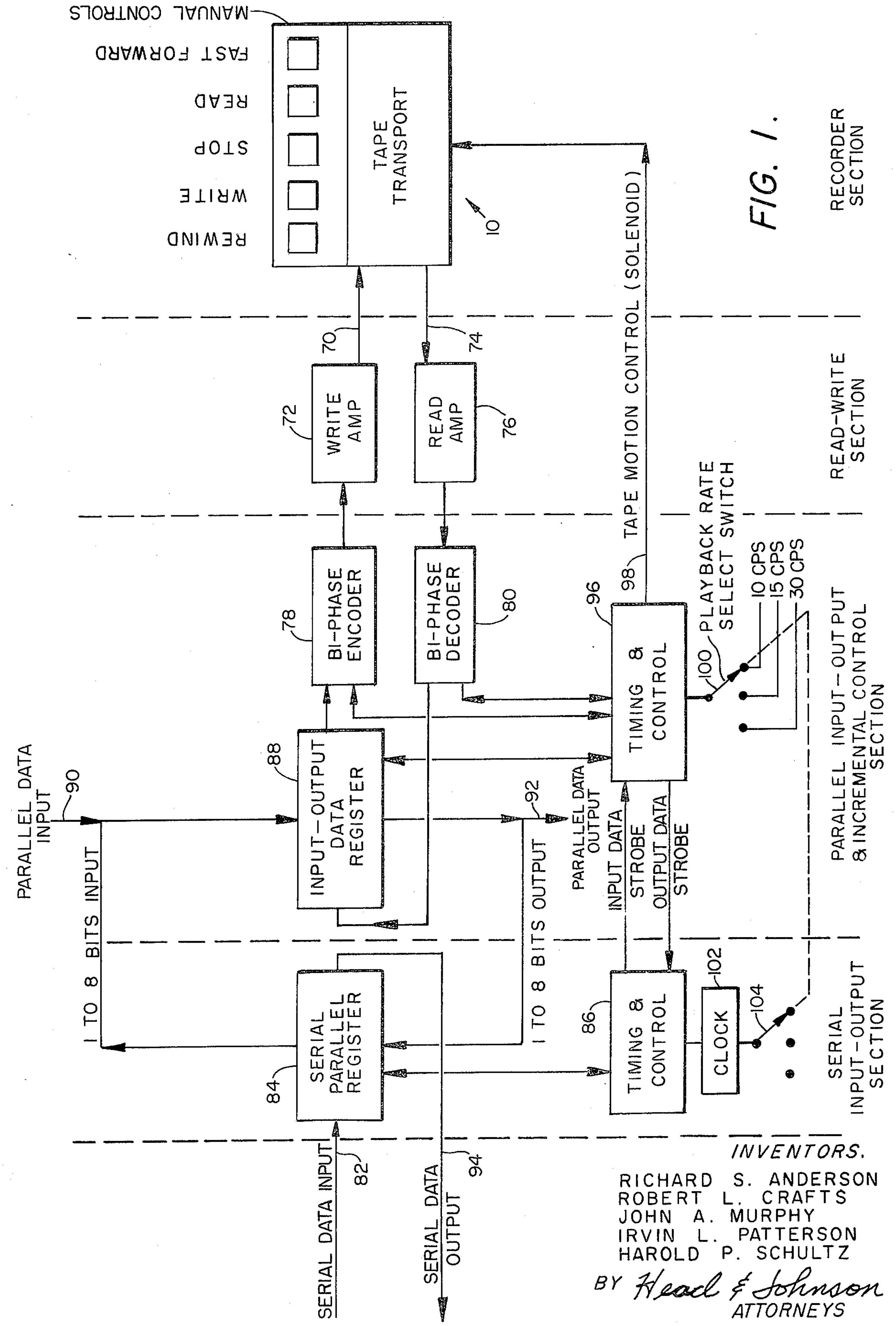
FIG. 1 is a block diagram of a means for recording multi-bit character data according to the invention, including electronic control sections for receiving and delivering data in serial or parallel form.

Referring first to FIG. 1, a block diagram of an embodiment of the invention is shown. The illustrated embodiment includes a recorder section, a read-write section, a parallel input-output and incremental control sections, and a serial input-output section as each section is identified on the drawing. The serial input-output section is an optional feature of the invention and is utilized to receive and transmit data in serial form. When data is to be received and transmitted in parallel form the serial input-output section is not required.

The recorder section will first be described by reference to FIGS. 2, 3 and 4. The recorder section consists of a tape transport, generally indicated by the numeral 10. A base plate 11 supports the elements making up the tape transport. The base plate 11 includes means to receive a tape cassette 12 thereon, the cassette being of standard design well known in the industry. The tape cassette 12 includes a wind spool 14 and a rewind spool 16 which receives a magnetic tape 18 thereon.

Positioned on the base plate 11 is a record-playback head 20 which, when the mechanism is in the operating mode, is in contact with magnetic tape 18. Record-playback head 20 may also be termed a write-read head and may be either a single head which serves the dual functions or separate heads for each function. A guide 22 insures proper alignment of tape 18 with head 20. An opening 24 in cassette 12 receives a capstan shaft 26 against which tape 18 is pressed by means of a pinch roller 28. The rotation of capstan shaft 26 causes movement of the tape 18 past record-playback head 20 when the apparatus is in record or playback mode. The mechanism shown in FIG. 1 is not unlike that of a typical cassette type tape recorder in which capstan shaft 26 is continuously rotated in the record mode to move tape 18 past head 20.

Figures 2, 3, 4:
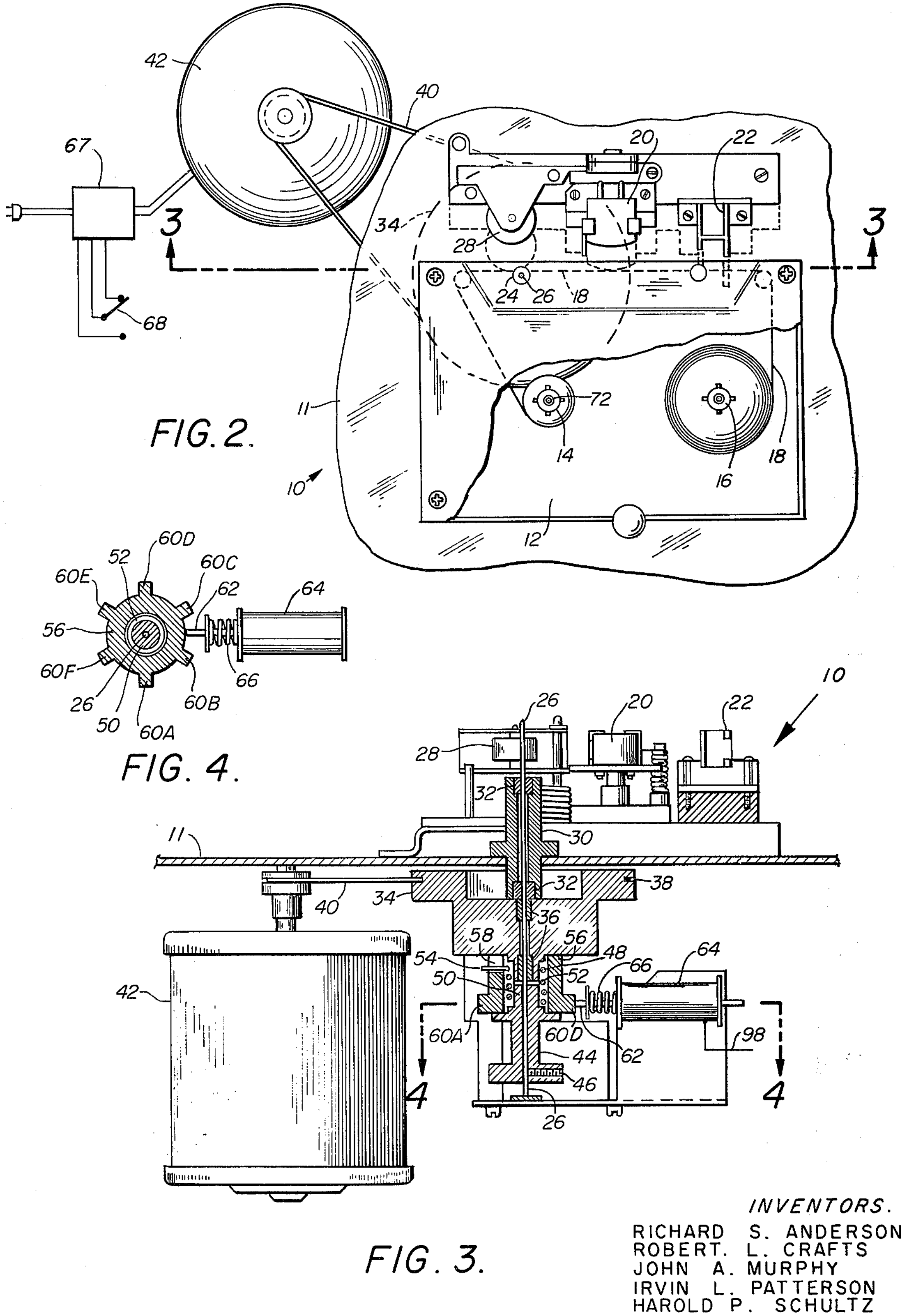
FIG. 2 is a top view of a tape transport apparatus which forms a portion of the invention for recording multi-bit character data.
FIG. 3 is a cross-sectional view taken along the line 3—3 of FIG. 2.
FIG. 4 is a cross-sectional view taken along the line 4—4 of FIG. 3 showing the arrangement of the ratchet member having a plurality of teeth thereon and a solenoid which controls the rotation of the ratchet member.

FIG. 3 shows details of the invention including means whereby the capstan shaft 26, rather than being rotated continuously as in the typical tape recorder, is rotated incrementally so that tape 18 is moved only as data, in multi-bit character form, is recorded. FIG. 3 is shown without the cassette 12. A bearing block 30 having an opening therethrough and a bearing 32 at each end is affixed to the base plate 11 and rotatably supports the capstan shaft 26. Rotatably supported on the capstan shaft 26 is a flywheel 34 having an opening therethrough receiving shaft 26 and having bearings 36 which insure low frictional relationship between the flywheel 34 and the shaft 26. Flywheel 34 includes a groove 38 in the exterior periphery which receives a belt 40 driven by motor 42. When motor 42 is energized flywheel 34 rotates continuously about the capstan shaft 26.

Affixed to the capstan shaft 26 is a drive collar 44 held to the shaft by set screw 46. Flywheel 34 includes an integral reduced diameter shoulder portion 48 at one end and inlike manner the drive collar 44 includes a reduced diameter shoulder portion 50 at the end adjacent the flywheel. The shoulder portions 48 and 50 are of approximately the same external diameter and both are coaxial about shaft 26.

Positioned on shoulder portions 48 and 50 is a coiled spring 52. The spring 52 has, at the end thereof adjacent the flywheel 34, a radially extending tang portion 54. The spring 52 is coiled in the direction such that the rotation of flywheel 34 tends to wrap the spring more tightly about the shoulder portion 48 of the flywheel and shoulder portion 50 of the drive collar. Spring 52 has a normal internal diameter slightly less than the external diameter of the shoulder portions 48 and 50 so that frictional relationship between these components normally exists.

Received about spring 52 is a tubular ratchet member 56, the interior diameter of the ratchet member being slightly larger than the exterior diameter of spring 52. A notch 58 in the ratchet member receives the tang 54 of spring 52.

The exterior of ratchet 56 has a plurality of integral radial tooth portions 60 extending from the exterior circumferential surface. In the illustrated arrangement there are six of such teeth, 60A, 60B, 60C, 60D, 60E, and 60F, spaced 60° relative to each other on the ratchet member circumferential surface. (See FIG. 4). Supported adjacent the ratchet member 56 is a movable ratchet release bar. In the illustrated arrangement the ratchet release bar is in the form of a plunger 62 of a solenoid 64. A spring 66 normally retains the ratchet release bar, or plunger 62, in position to engage teeth 60A and 60B as the ratchet member 56 rotates, the plunger 62 being withdrawn and out of contact when solenoid 64 is energized. When the release bar 62 engages a tooth on the ratchet 56 spring 52 tends to be unwound, thus decoupling the flywheel 34 from drive collar 44.

Means must be provided for winding the tape on spools during the record, rewind, and playback mode, including mechanisms for compensating for various rates of rotation of the drive shafts which accomplish winding and rewinding. Such devices and apparatus are not shown here since such forms no part of the invention. Reference may be had to copending patent application entitled "Apparatus For Moving Tape Incrementally Past A Recording Head," application Ser. No. 878,820, filed Nov. 19, 1969 now U.S. patent No. 3,595,499, for detailed illustration and explanation of apparatus which may be utilized with the invention for accomplishing winding of tape upon the reels of the tape cassette during record, rewind and playback.

For reasons which will be described subsequently it is desirable that the speed of the tape when moving past the write head in the record mode be slightly faster than when moving past the read head in the playback mode. Several means may be utilized to accomplish such speed change. The arrangement illustrated utilizes a frequency controlled AC source 67 which provides AC energy for synchronous motor 42. A switch 68 actuated by the control devices of the tape recorder automatically adjusts the speed of motor 42 between the record mode and the playback mode by varying the frequency of AC voltage supplied to motor 42.

Referring back to FIG. 1, data passes to tape transport 10 by way of conductor 70. A write amplifier 72 is utilized to correct the level and wave form of the data passing to the transport. Data is received out of the transport 10 on conductor 74, the output of data in like manner being passed through a read amplifier 76 for adjusting the level and wave form of output required for subsequent processing.

To adapt the input and output data to the preferred bi-phase encoder 78 and a bi-phase decoder 80 are utilized.

Serial data to be recorded is applied at conductor 82 in the form of spaced sequence voltage pulses. The serial data input is applied to a serial-parallel register 84 wherein the serial data is converted to parallel data and shifted, upon the application of the strobe signal applied by timing and control circuit 86, into an input-output data register 88. When data to be recorded is received in parallel form, it may be applied directly to the input-output data register 88 by way of multi-conductor 90, along with a suitable strobing signal or a preselected bit. When parallel data output is desired it may be taken from the input-output data register 88 directly from output 92. When data is to be taken out in serial form the parallel data is transmitted to the serial-parallel register 84 upon the application of a strobe pulse from timing and control circuit 88 and the serial data is applied to output conductor 94 in serial form.

Timing and control circuit 96 applies strobe pulses as necessary to key the input-output data register 88, the bi-phase encoder 78, bi-phase decoder 80, and by means of conductor 98, to signal tape transport 10 to control the tape motion during the write and read mode. Conductor 98 extends to solenoid 64 (see FIG. 3).

Figure 7:
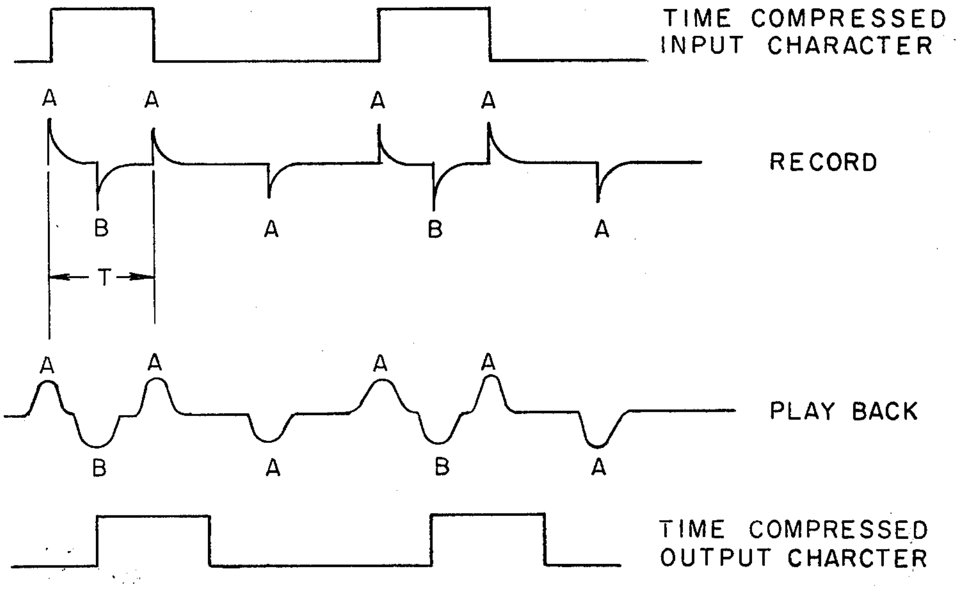
FIG. 7 is a view of a time compressed multi-bit character with boundary pulses as seen across the record head, the subsequent playback and the time compressed input-output character.

Since all tape transports exhibit some speed variations and the data recovered in saturation recording is not an exact reproduction of the recorded data (it is the time derivative), it is necessary to process the recorded and reproduced data to faithfully recover the time-voltage (or current) relationships. Upon recording the timing and control circuitry 96 provides a pulse that proceeds and follows each bit of the time compressed multi-bit input character. These pulses are termed boundary pulses and are indicated by A on FIG. 7. The data pulses are indicated by B. Referring to FIG. 1 the timing and control circuit 96 along with the bi-phase encoder 78 provide a boundary-sample-boundary recording in which the sample is one bit of the time compressed multi-bit input character. The boundary pulses outline the position between which a bit pulse must exist. The presence or absence of a bit pulse signifies whether a logical 1 or 0 was in that bit position of the compressed multi-bit character.

Referring to FIG. 1, upon playback the bi-phase decoder 80 and the timing and control circuit 96 utilize the boundary pulses (A in FIG. 7) to synchronize the clock in the timing and control circuit 96. In the process of recovering the multi-bit character the boundary pulses are removed. The recovered character is serially shifted into the input-output data register 88. When all bits of the time compressed multi-bit character are recovered and stored in the input-output data register 88 an output strobe is generated by the first bit of the character and the character is read out to external devices in parallel form by line 92 or it is read into the serial-parallel register 84.

If the data is put into the serial-parallel register 84 it is serially shifted out to external devices with a bit duration timing signal provided by the timing and control circuit 86. The timing for the serial output character is provided by clock 102 and switch 104 which is preset when the data is recorded.

Tape transport 10 typically includes controls, such as by buttons illustrated, to effect tape rewind, write, stop, read, and fast forward modes. Data is applied when the transport is in the write mode and is recorded in incremental steps. Data is taken out of the transport when in the read mode, at which time tape moves continuously past the read-write head.

In an exemplary embodiment of the invention it may be utilized to record data occurring at a maximum rate of 10 characters per second, and played back at one of three rates, that is, 10 characters per second, 15 characters per second, or 30 characters per second. The playback rate is selected by means of a switch 100 which controls the timing functions of timing control circuit 98. Particularly, switch 100 controls the tape motion control signal applied to conductor 98 to regulate the duration that the solenoid is energized upon the recording of each data character. When serial data input or output is being recorded or played back the timing or control circuit 86 is controlled by means of a clock circuit 102. Clock circuit 102 generates a controlled, evenly spaced, pulse signal the rate of which is determined by the record or playback rate. Switch 104 is preferably operated in unison with switch 102.

OPERATION OF THE INVENTION

The essence of the invention is the method of controlling the ratchet release bar 62 on the tape incrementing mechanism to accomplish a multiple incrementing rate, and thereby to accomplish a multiple character recording rate.

If ratchet 56 has only two teeth 60A and 60D and with flywheel 34 rotating at 5 revolutions per second, the maximum rate that the capstan shaft 26 could be incremented or stepped, would be 10 increments per second. Each increment would be ½ revolution of the capstan shaft or 180°. Magnetic tape 18 driven by the incrementing capstan shaft 26 may receive a character during each increment; thus the character recording rate can be anything up to a maximum of 10 characters per second. When the recorded characters are played back continuously, and with the capstan shaft 26 rotating at 5 revolutions per second, the playback rate would be 10 characters per second.

In the case of a six tooth ratchet 56, as illustrated, operating in conjunction with flywheel 34 rotating at 5 revolutions per second, the solenoid 64 can function to permit shaft 26 to increment six times during each revolution of fly-wheel 34, thus enabling the tape transport to record at any rate up to a maximum of 30 characters per second.

In the illustrated embodiment utilizing a ratchet 56 having six teeth and with flywheel 34 rotating at the rate of five revolutions per second, plunger 62 may be activated to release a tooth 60 on the ratchet by means of a timed voltage pulse so that the plunger is not immediately returned to its original position but is held in place long enough to permit more than one tooth to pass. If three teeth are permitted to pass and the plunger is then released to stop the fourth tooth, the ratchet 56 and capstan shaft 26 will have rotated ½ revolution, or 180°. When thus incrementing two times per shaft revolution and with the flywheel 34 rotating at 5 revolutions per second the maximum incrementing rate is 10 characters per second. It can be seen that by returning the plunger 62 immediately to its original position, or by delaying the return of the plunger, the tape can be incremented at two different rates. When the recording incrementing rate is 10 characters per second, the continuous playback rate is 10 characters per second. When the recording incrementing rate is 30 characters per second the continuous playback rate will be 30 characters per second.

A third possible combination can be achieved with the arrangement in which the ratchet 56 has six teeth and with flywheel 34 rotating at 5 revolutions per second scheme. When the solenoid plunger 62 is activated and held long enough to permit two teeth to pass and released to stop the third tooth, the capstan shaft 26 will rotate ⅓ revolution, or 120°. At this rate the maximum incremental record rate is fifteen characters per second and the continuous playback rate is fifteen characters per second.

Thus the six tooth ratchet, 5 revolutions per second arrangement allows up to three separate record and playback character rates. It is apparent that a great number of ratchet tooth numbers and revolutions per second combinations exist, each of which achieve different character per second record-playback arrangements.

In addition to the above described method of operation of the invention a typical application is the recording of data generated such as by a single character rate teletypewriter, and then playing back the data at a different rate. Each character coming out of a teletypewriter with a maximum output rate of 10 characters per second is 100 milliseconds long with its individual code bits or cells equally spaced. In a Teletype Corporation ASR33 Teletypewriter, which has a maximum operating capability of 10 characters per second, there is a start bit, seven character bits, a parity bit and two stop bits for a total of eleven bits in each character. The character is 100 milliseconds long and each bit is 9.09 milliseconds long. Ten characters per second equals 110 possible bits per second. To record such data the timing and control circuit of serial-parallel input register 84 has a clock 102 that gates each incoming bit into the serial shift register. The clock frequency is the same as the rate that the bits are being received. When the input device is a Teletype ASR33, that frequency is 110 Hz.

It can be seen that as serial input or output rates increase, the shift register clock frequency must increase proportionally.

When characters from the ASR33 Teletype are coming at any rate up to 10 characters per second and are being recorded incrementally on the tape utilizing a six tooth ratchet device by the method described above, the input shift register must be compatible with the Teletypewriter output and operate at 110 Hz. With switch 100 set on 30 CPS each data character is recorded on the tape in 1/6 of a capstan shaft revolution, or at the rate of 6 characters per revolution of the capstan shaft. In the playback mode with the capstan shaft operating at 5 revolutions per second the output data rate is then thirty characters per second. The frequency of the signal from clock 102 to the timing and control circuit 86 of series-parallel register 24 must be 300 Hz to gate each character out of the recorder bit by bit.

Data coming out of the recorder at the higher rate can then be fed to a computer or other device that will accept the higher data rate.

This invention utilizes the switchable frequency of clock 102 to gate characters into the serial-parallel register 84 which then feeds the input-output data register 88 in conjunction with means to vary the hold-in-time of solenoid 64 to achieve a multiple character rate record-reproduce incremental tape recorder.

In place of three positions on switch 100 and 104 as illustrated in the drawings, six position switches may be utilized in conjunction with a ratchet 88 having six teeth and with fly-wheel 34 rotating at 5 RPM, to achieve six different input and output rate combinations as follows:

| | Switch Position | Record Incrementally | Frequency of Clock Data Input | Continuous Playback | Frequency of Clock Data Output |
|---|---|---|---|---|---|
| 1 | 10/10 | Up to 10 Char/Sec | 110 Hz | 10 Char/Sec | 110 Hz |
| 2 | 10/15 | Up to 10 Char/Sec | 110 Hz | 15 Char/Sec | 150 Hz |
| 3. | 10/30 | Up to 10 Char/Sec | 110 Hz | 30 Char/Sec | 300 Hz |
| 4. | 15/15 | Up to 15 Char/Sec | 150 Hz | 15 Char/Sec | 150 Hz |
| 5 | 15/30 | Up to 15 Char/Sec | 150 Hz | 30 Char/Sec | 300 Hz |
| 6 | 30/30 | Up to 30 Char/Sec | 300 Hz | 30 Char/Sec | 300 Hz |

Figure 5:
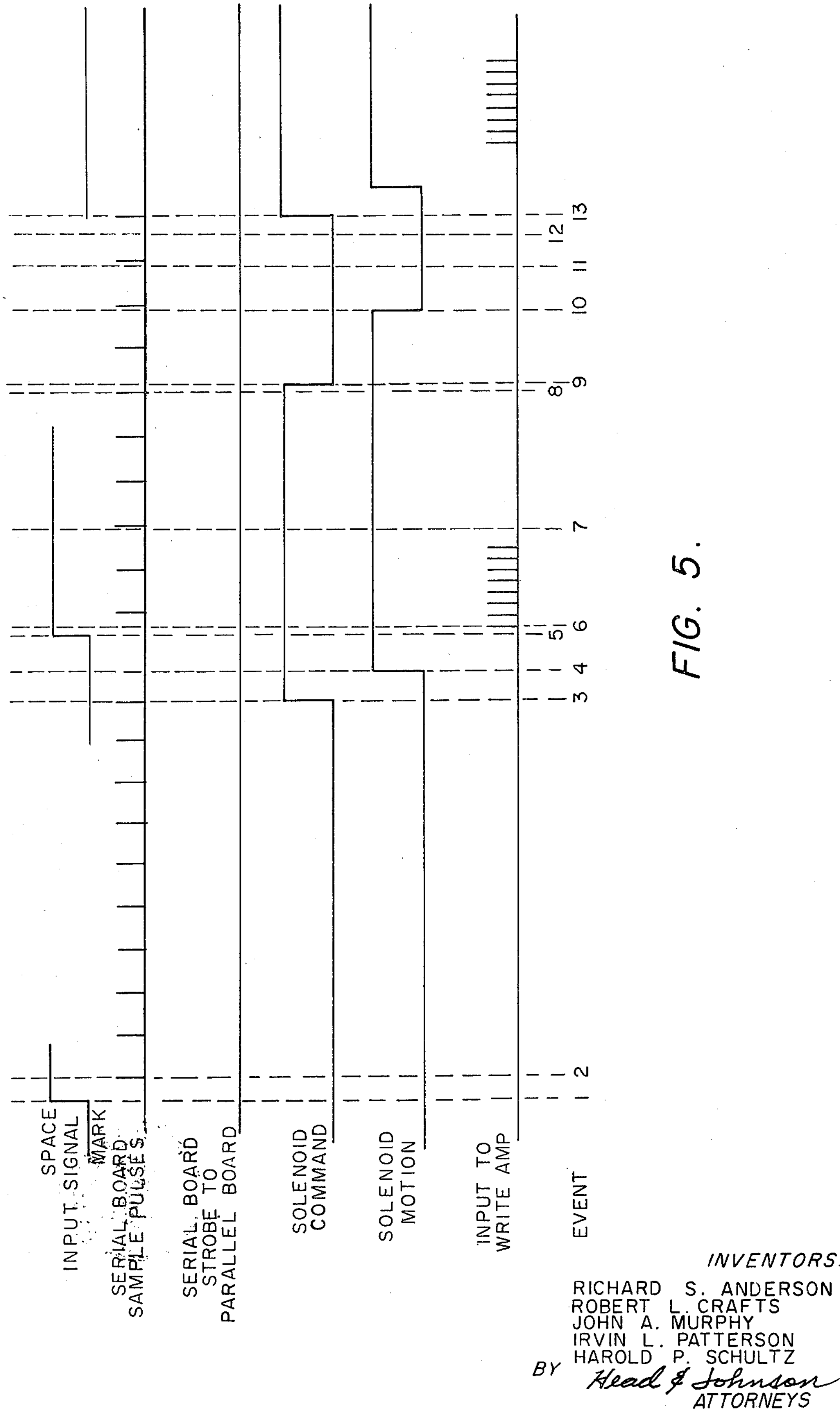
FIG. 5 is a chart showing the time relationship of different events of the apparatus in the recording mode as utilized to record multi-bit character data.
Figure 6:
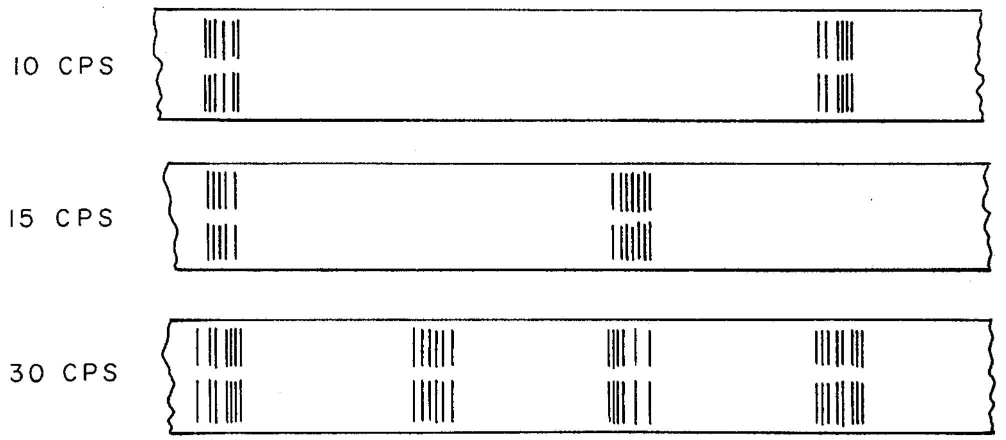
FIG. 6 is a view of the time compressed multi-bit character recorded at 10, 15 and 30 chaaracters per second.

For a better understanding of the time relationship of the sequence present during the recording of multi-bit character signals reference may be had to FIG. 5. The events which take place at the times indicated 1 through 13 are as follows:

1. Start bit of teletype code initiates timing and control circuit 86 of the serial-parallel register 84 to begin timing cycle;
2. Serial-parallel register 84 samples teletype signal at middle of bits and stores data in serial-parallel register 84;
3. Entire character is stored in serial-parallel register 84 and it generates a strobe which transfers the eight data bits to the input-output data register 88 and initiates timing and control circuit 96 timing cycle, and the timing and control circuit 96 sends command by way of conductor 98 to solenoid 64, and serial-parallel register is ready for next character;
4. Solenoid 64 withdraws plunger 62, permitting ratchet 56 to turn which turns capstan shaft 26 and initiates tape motion;
5. Start bit of next character occurs at this time (or later) initiating another serial-parallel register timing cycle;
6. Tape 18 has come up to speed and data is written on tape (timing bits only shown -- data bits fall between timing bits);
7. Capstan 26 has rotated 60° -- one tooth 60 has passed withdrawn solenoid plunger 62;
8. Capstan 26 has rotated 120°, -- two teeth 60 have passed withdrawn solenoid plunger 62;
9. Timing and control circuit 96 drops solenoid command;
10. Solenoid plunger 62 returns to de-energized position;
11. Input-output data register 88 is ready for next data character;
12. Capstan 26 has rotated 180° and fourth tooth 60 hits solenoid plunger 62 causing ratchet 56, capstan shaft 26 and tape 68 to stop; and
13. Timing and control circuit 86 strobes next character into input-output data register and initiates another timing cycle.

In the exemplary embodiment described herein the input-output data register 88 enables the apparatus, when in record mode, to accept parallel characters and controls the incrementing mechanism to record characters at rates up to the maximum rate provided according to the tape transport design parameters such as 30 characters per second. In playback such apparatus continuously reproduces eight line parallel words at the maximum rate provided, such as thirty characters per second. In the serial input-output mode, including the serial-parallel register 84, the apparatus accepts a serial start-stop code with up to eight data bits, and controls the incrementing mechanism rates up to the maximum provided by design of tape transport 10, such as thirty characters per second. In playback the apparatus reproduces continuously the original recorded code at a maximum character rate which may be preselected in advance, such as 10, 15 or 30 characters per second.

An important aspect of the invention is the provision of speed changing means, such as accomplished by the frequency-controlled AC source 67, as controlled by switch 68 (see FIG. 2). Switch 68 may be interconnected with the control means of tape transport 10 such that when the tape transport is switched to the write mode motor 42 rotates flywheel 34 at a slightly faster speed. In the read mode of tape transport 10 switch 68 causes motor 42 to rotate at a slightly slower rate. If shaft 26 has a nominal speed of rotation of 5 RPM, switch 68 functions so that in the write mode shaft 26 rotates at more than 5 RPM and in the read mode it rotates at less than 5 RPM. As an example, the speed control mechanism may be arranged such that shaft 26 rotates at 320 RPM during write mode and 280 RPM during read mode. The reason the speed change between the write and read modes is necessary is that in the write mode tape 18 must move at a speed to accept the maximum character per second rate to be recorded. Since some deviation in the speed of rotation of shaft 26 may inevitably occur, the speed of rotation is set faster than the minimum which would be required so that in all cases the tape is advanced and ready to accept the next data signal. When in the read mode the situation is the opposite, that is, the character per second output must not exceed that of a preselected design standard. For instance, if the read mode produces ten characters per second and is to feed equipment which is designed to accept 10 characters per second it must in no event play back the data at a rate faster than 10 characters per second. To insure that the playback rate will always be no greater than the design maximum character rate output the tape is operated at a slightly slower speed during playback. Putting it another way, the apparatus of the invention provides a recording device in which the speed of the tape during write or record mode is always at the high end of the tolerance and the speed of the tape during the read or playback mode is always at the low end of the tolerance insuring complete harmony of the device with both input and output data handling apparatus.

The invention has been described with a certain degree of particularity although it is manifest that many changes may be made in the details and construction in the arrangement of the components without departing from the spirit and scope of this disclosure. It is understood that the invention is not limited to the exemplary embodiment set forth herein but is to be limited only by the scope of the attached claim or claims, including the full range of equivalency to which each element or step thereof is entitled.

What is claimed is:

1. A recording means for recording multi-bit character data on tape at a given character-per-second rate and playing back such data at the same or a different character-per-second rate comprising:

a write head and a read head;

a rotatable capstan shaft against which tape is pressed, the rotation of the capstan shaft serving to advance the tape past the write head and read head;

a continuously rotated flywheel supported coaxially about said capstan shaft, said flywheel having, at one end thereof, a reduced diameter shoulder portion coaxial with said capstan shaft;

a drive collar affixed to said capstan shaft and having a reduced diameter shoulder portion coaxial with said capstan shaft, said flywheel shoulder and drive collar shoulder being of substantially the same diameter and adjacent each other;

a coiled spring coaxially received about said capstan shoulder and said drive collar shoulder, the normal internal diameter of the spring being slightly smaller than the external diameter of said flywheel shoulder and said drive collar shoulder, the direction of rotation of said flywheel tending to tighten said spring about said flywheel shoulder and said drive collar shoulder, said spring having a radially extending tang at the end thereof received on said flywheel shoulder;

a tubular ratchet member coaxially received about and externally of said spring, the interior diameter of said ratchet member being slightly larger than the external diameter of said spring, said ratchet member having a slot therein receiving said tang of said spring whereby said spring and said ratchet member are rotationally interlocked;

a ratchet release bar movably supported adjacent said ratchet member and movable between a first and a second position, and arranged such that in said first position said release bar engages said ratchet member preventing the rotation thereof and causing said spring to tend to unwind to thereby decouple said flywheel from said drive collar, and in said second position said release bar is removed from said ratchet member and permits the rotation of said ratchet member;

means of moving said ratchet release bar from said first to said second position for a uniform preselected time duration coincident with the receipt of each data character on said write head whereby the data character is recorded on the tape as the tape is incrementally advanced;

means of rewinding the tape; and means of moving and holding said ratchet release bar from said first to said second position for continuously advancing the tape having data recorded thereon past said read head.

2. An incremental recording apparatus for moving a tape incrementally past a recording head according to claim 1 wherein said ratchet member has a plurality of equally spaced tooth portions extending radially from the exterior surface thereof, and wherein said ratchet release bar, in said first position, extends adjacent the exterior surface of said ratchet member and is engaged by said tooth portions of said ratchet member preventing the rotation of said ratchet member and in said second position said release bar is removed from adjacent said ratchet member and permits the rotation of said ratchet member, the ratchet release bar being retained in said second position for a uniform preselected length of time coincident with the receipt of each data character on said write head whereby after the passage of a preselected uniform number of tooth portions said ratchet release bar is returned to said first position.

3. A recording apparatus for recording multi-bit character data on tape at a given character-per-second rate and playing back such data at the same or a different character-per-second rate according to claim 2 wherein:

said ratchet release bar and means of selectably moving said ratchet release bar includes a solenoid having a plunger extending therefrom, said solenoid being supported adjacent said ratchet means, said solenoid plunger being positioned between a first and second position according to the energization of said solenoid, in said first position said plunger having engagement with a said ratchet tooth and in said second position said plunger is withdrawn and said ratchet teeth pass said plunger as said ratchet rotates, the time duration for the recording of each data character being preselectably determined by the time duration of energization of said solenoid.

4. A recording apparatus for recording multi-bit character data on tape at a given character-per-second rate and playing back such data at the same or a different character-per-second rate according to claim 2 in which said flywheel is rotated at a faster rate when data is recorded on said tape than when data is being played back from said tape.

* * * * *